(12) United States Patent
Weimann et al.

(10) Patent No.: US 8,676,009 B2
(45) Date of Patent: Mar. 18, 2014

(54) MONOLITHIC PHOTONIC INTEGRATED CIRCUIT

(75) Inventors: Nils Weimann, Gillette, NJ (US); Vincent Houtsma, New Providence, NJ (US); Mohand Achouche, Montrouge (FR)

(73) Assignee: Alcatel Lucent, Paris (FR)

( * ) Notice: Subject to any disclaimer, the term of this patent is extended or adjusted under 35 U.S.C. 154(b) by 257 days.

(21) Appl. No.: 13/112,653

(22) Filed: May 20, 2011

(65) Prior Publication Data
US 2012/0237153 A1 Sep. 20, 2012

(51) Int. Cl.
*G02B 6/24* (2006.01)

(52) U.S. Cl.
USPC .............................................. 385/46; 385/48

(58) Field of Classification Search
USPC ...................................................... 385/46–48
See application file for complete search history.

(56) References Cited

U.S. PATENT DOCUMENTS

| 5,379,354 | A | * | 1/1995 | Jenkins | 385/46 |
| 6,069,990 | A | * | 5/2000 | Okawa et al. | 385/43 |
| 2001/0055444 | A1 | | 12/2001 | Kashihara | |
| 2002/0159703 | A1 | | 10/2002 | McGreer | |

FOREIGN PATENT DOCUMENTS

EP 2251722 A1 11/2010

OTHER PUBLICATIONS

Sakamaki, Y., et al., "One-Chip Integrated Dual Polarization Optical Hybrid using Silica-based Planar Lightwave Circuit Technology", ECOC 2009, Sep. 20-24, 2009, Vienna, Austria (Paper 2.2.4); 2 Pages.
Kim, Je Hong, et al., "Experimental Demonstration of Replicated Multimode Interferometer Power Splitter in Zr-Doped Sol-Gel" Journal of Lightwave Technology, vol. 24, No. 1, Jan. 2006 IEEE, p. 612-616.

* cited by examiner

*Primary Examiner* — Jerry Rahll
(74) *Attorney, Agent, or Firm* — Hitt Gaines, P.C.

(57) ABSTRACT

An optical device includes a waveguide slab, first and second input port couplers, and first and second output port couplers located over a planar optical substrate. The waveguide slab has a plane of symmetry. The first and second input port couplers extend from the waveguide slab and have an input coupler pair axis located about midway between the first and second input port couplers. The input coupler pair axis is offset at a nonzero first distance from the plane of symmetry. The first and second output port couplers extend from the waveguide slab and have an output coupler pair axis located about midway between the first and second output port couplers. The output coupler pair axis is offset at a different nonzero second distance from the plane of symmetry.

23 Claims, 11 Drawing Sheets

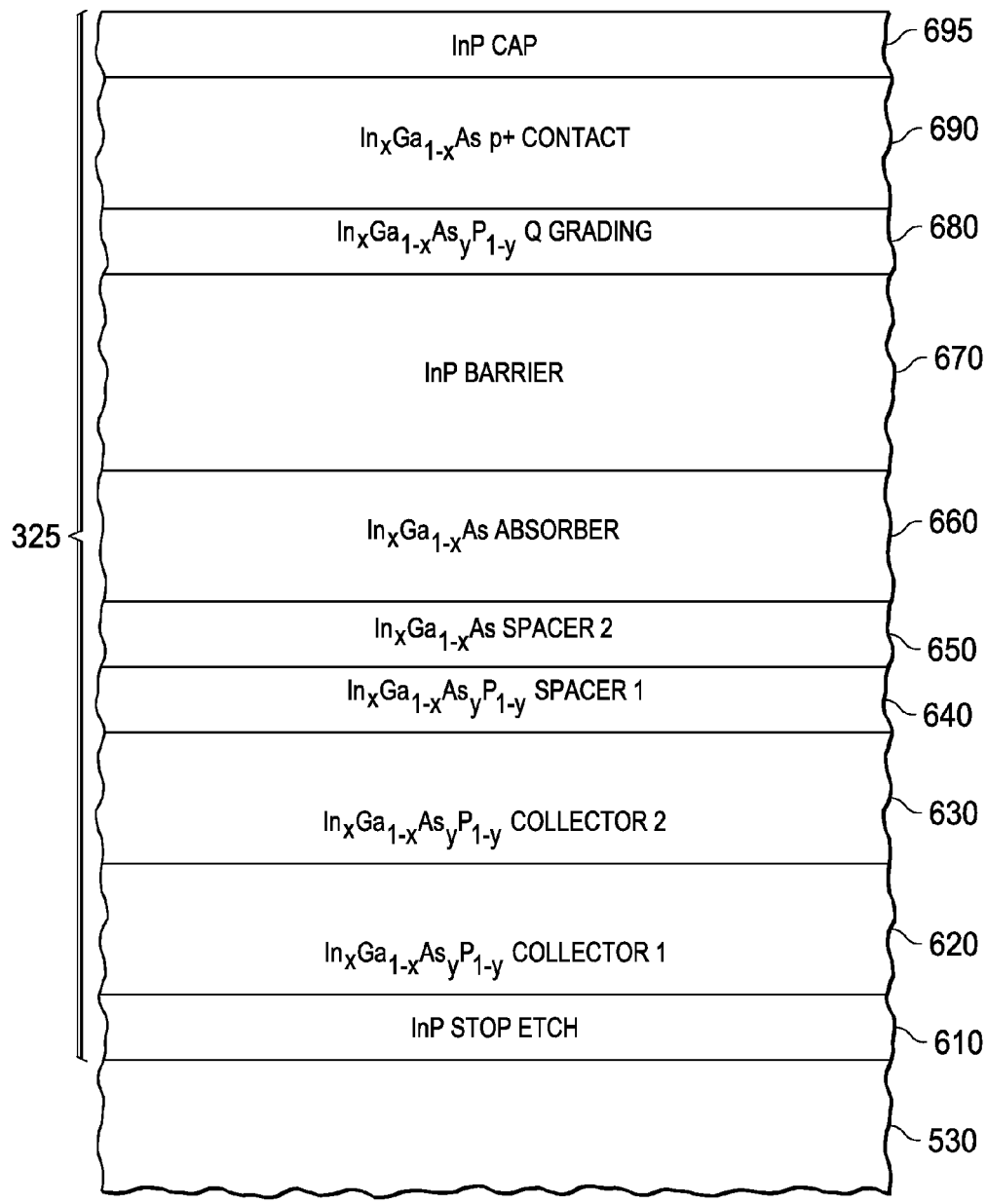

MONOLITHIC PHOTONIC INTEGRATED CIRCUIT

CROSS-REFERENCE TO RELATED APPLICATIONS

This application claims the benefit of U.S. Provisional Application Ser. No. 61/453,120, filed by Weimann, et al. on Mar. 15, 2011, entitled "Indium Phosphide Monolithic Photonic Integrated Circuit (PIC) Photoreceiver with Improved Reliability," commonly assigned with this application and incorporated herein by reference.

TECHNICAL FIELD

This application is directed, in general, to optical devices and methods of manufacturing and using optical devices.

BACKGROUND

Increasing integration of optical components on photonic integrated circuits (PICs) provides the ability to provide increasingly sophisticated optical devices using a single substrate. Usually such devices include optical path length adjusters, e.g. thermo-optical phase shifter, to adjust the optical path length of one or more optical waveguides on the PIC. Such path length adjusters add complexity and cost to optical systems, typically including power sources to power the path length adjuster, and a feedback control system to maintain a desired phase shift in the adjusted path.

SUMMARY

One aspect provides an optical device that includes a waveguide slab, first and second input port couplers, and first and second output port couplers located over a planar optical substrate. The waveguide slab has a plane of symmetry. The first and second input port couplers extend from the waveguide slab and have an input coupler pair axis located about midway between the first and second input port couplers. The input coupler pair axis is offset at a nonzero first distance from the plane of symmetry. The first and second output port couplers extend from the waveguide slab and have an output coupler pair axis located about midway between the first and second output port couplers. The output coupler pair axis is offset at a different nonzero second distance from the plane of symmetry.

Another aspect provides a method of forming an optical device. The method includes forming a waveguide slab, first and second input port couplers, and first and second output port couplers over a planar optical substrate. The waveguide slab has a plane of symmetry. The first and second input port couplers extend from the waveguide slab and have an input coupler pair axis located about midway between the first and second input port couplers. The input coupler pair axis is offset at a nonzero first distance from the plane of symmetry. The first and second output port couplers extend from the waveguide slab and have an output coupler pair axis located about midway between the first and second output port couplers. The output coupler pair axis is offset at a different nonzero second distance from the plane of symmetry.

BRIEF DESCRIPTION

Reference is made to the following descriptions taken in conjunction with the accompanying drawings, in which.

Figure 1:
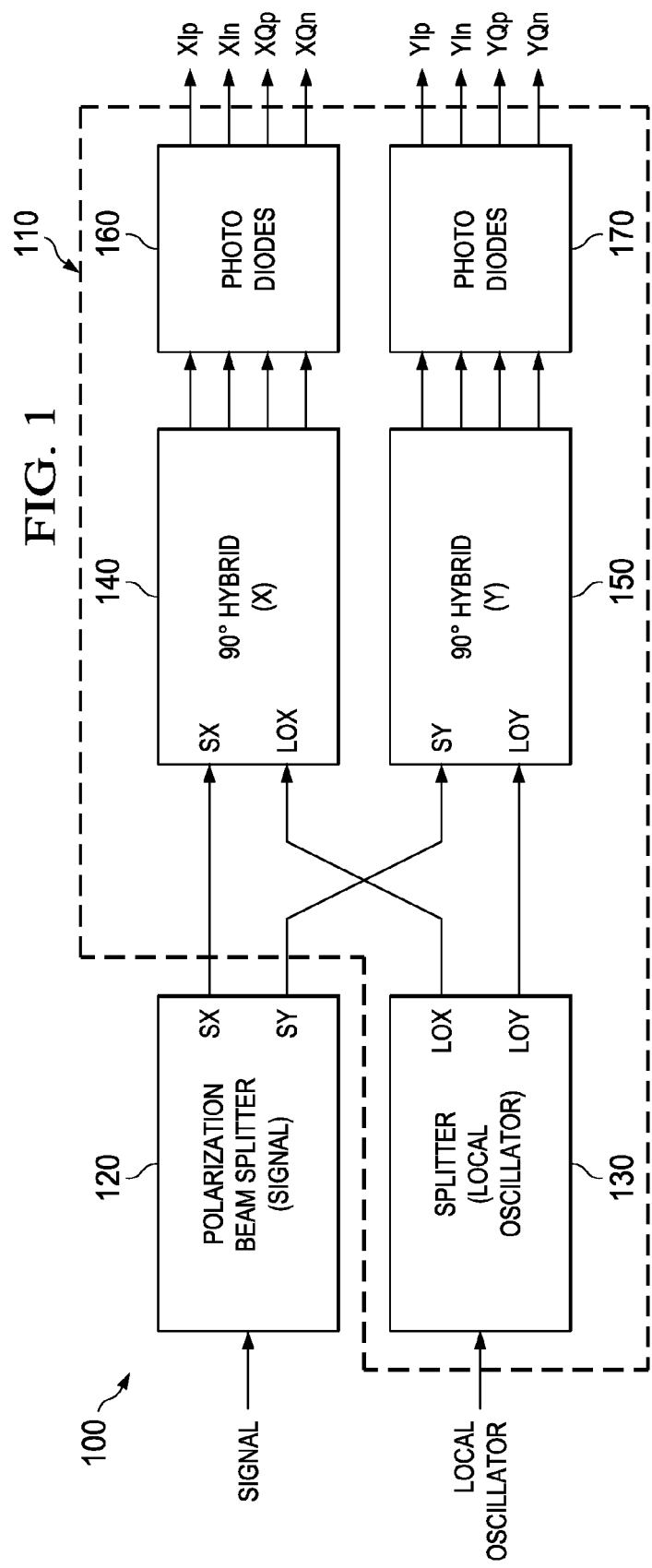
FIG. 1 illustrates a schematic diagram of an optical device in one embodiment of the disclosure, e.g. a coherent phase detection receiver.
Figure 3A:
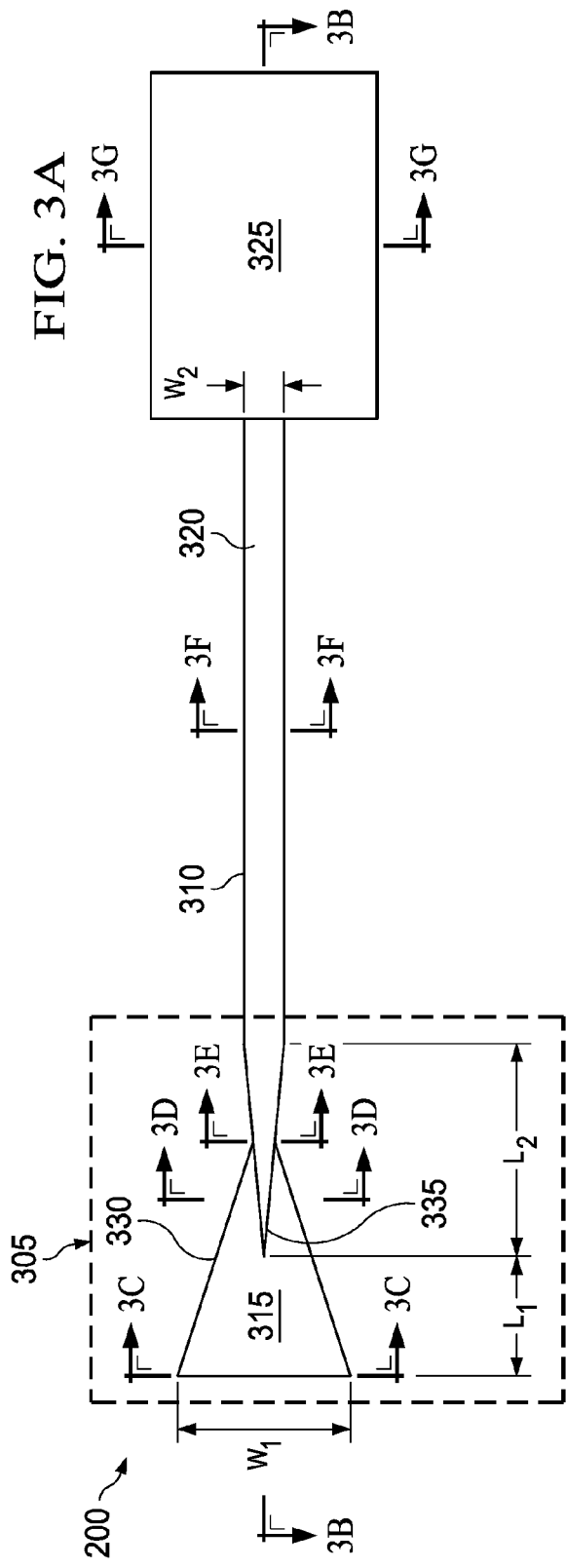
Figure 3B:
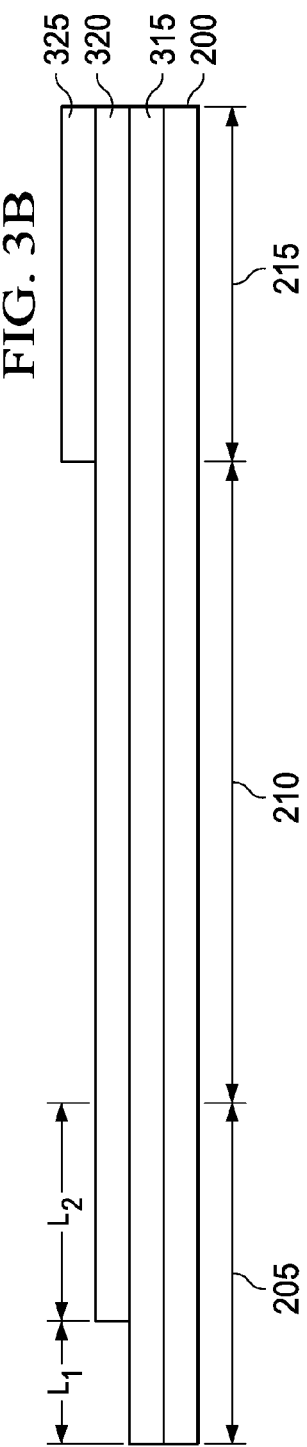
Figure 4:
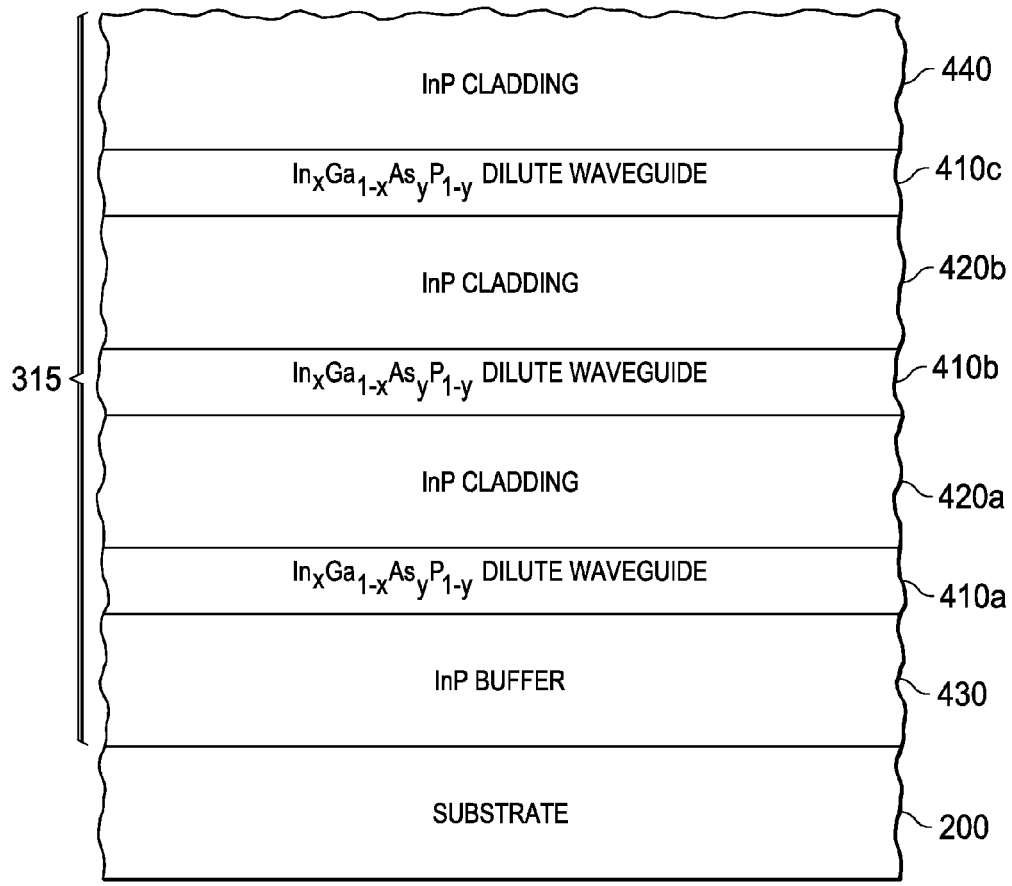
Figure 5:
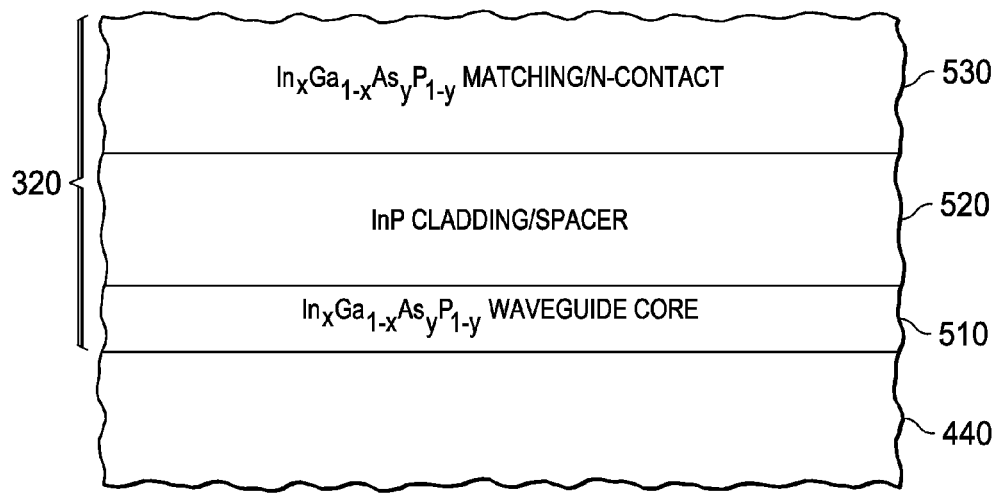
Figure 7A:
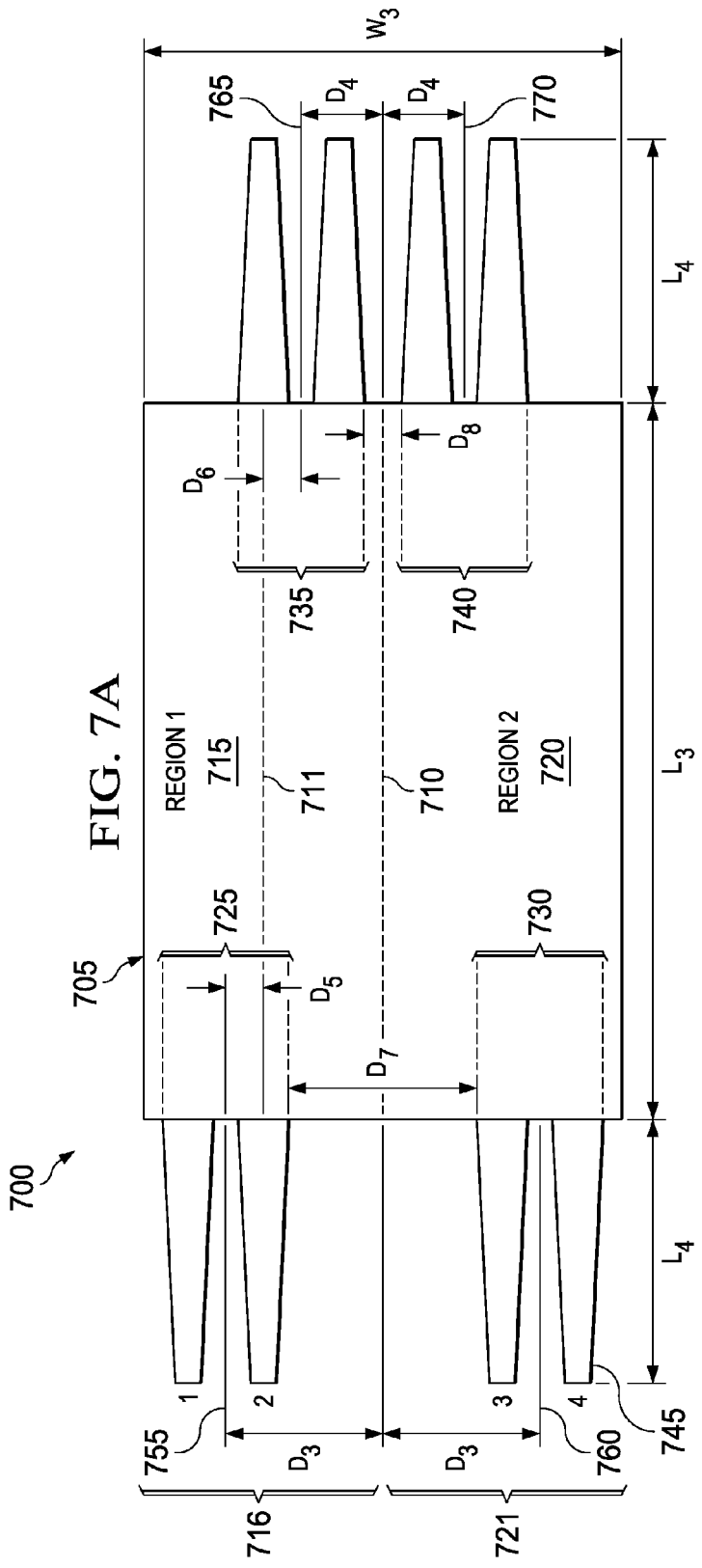
Figure 7B:
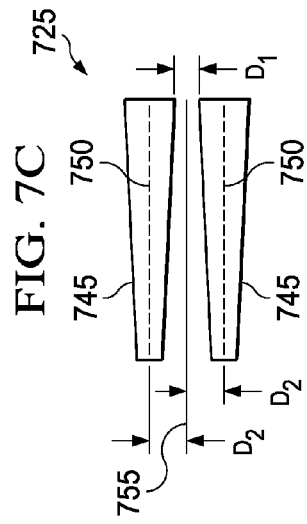
Figure 7C:
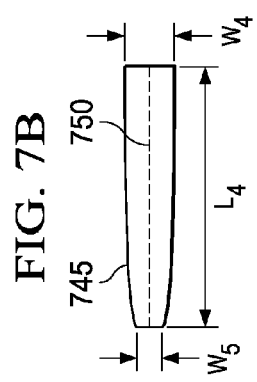
Figure 7D:
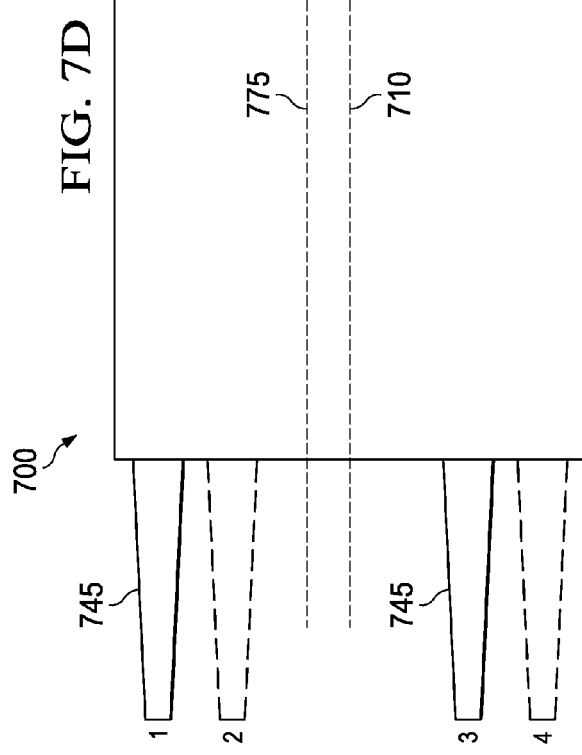
Figure 8:
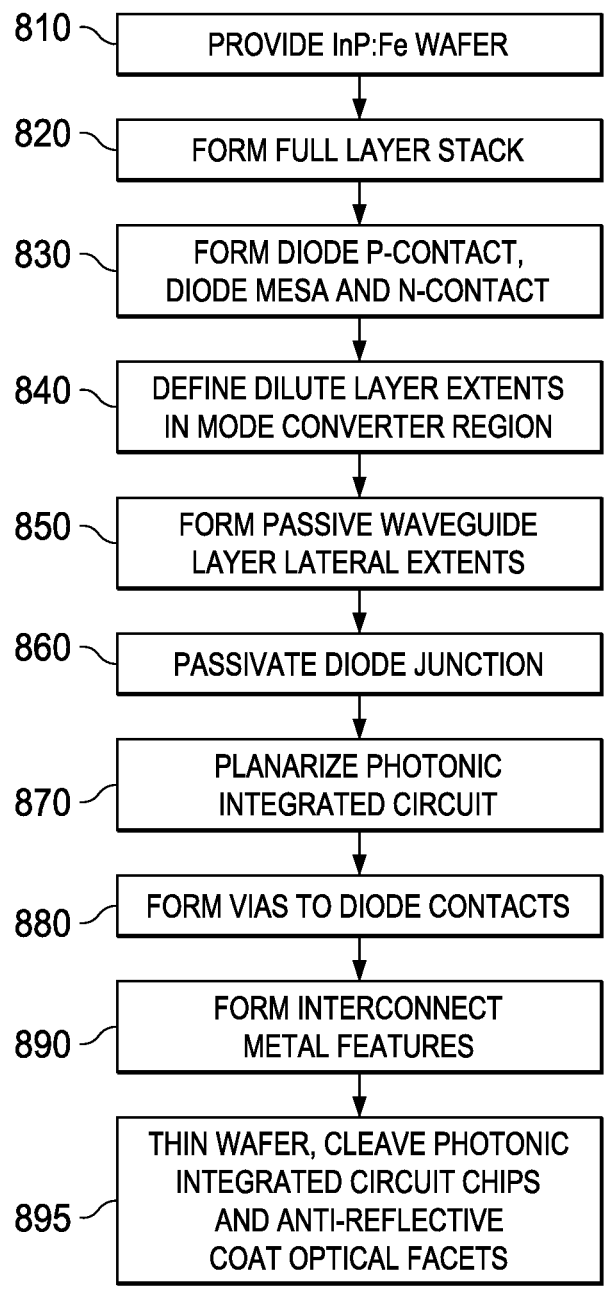
Figure 9A:
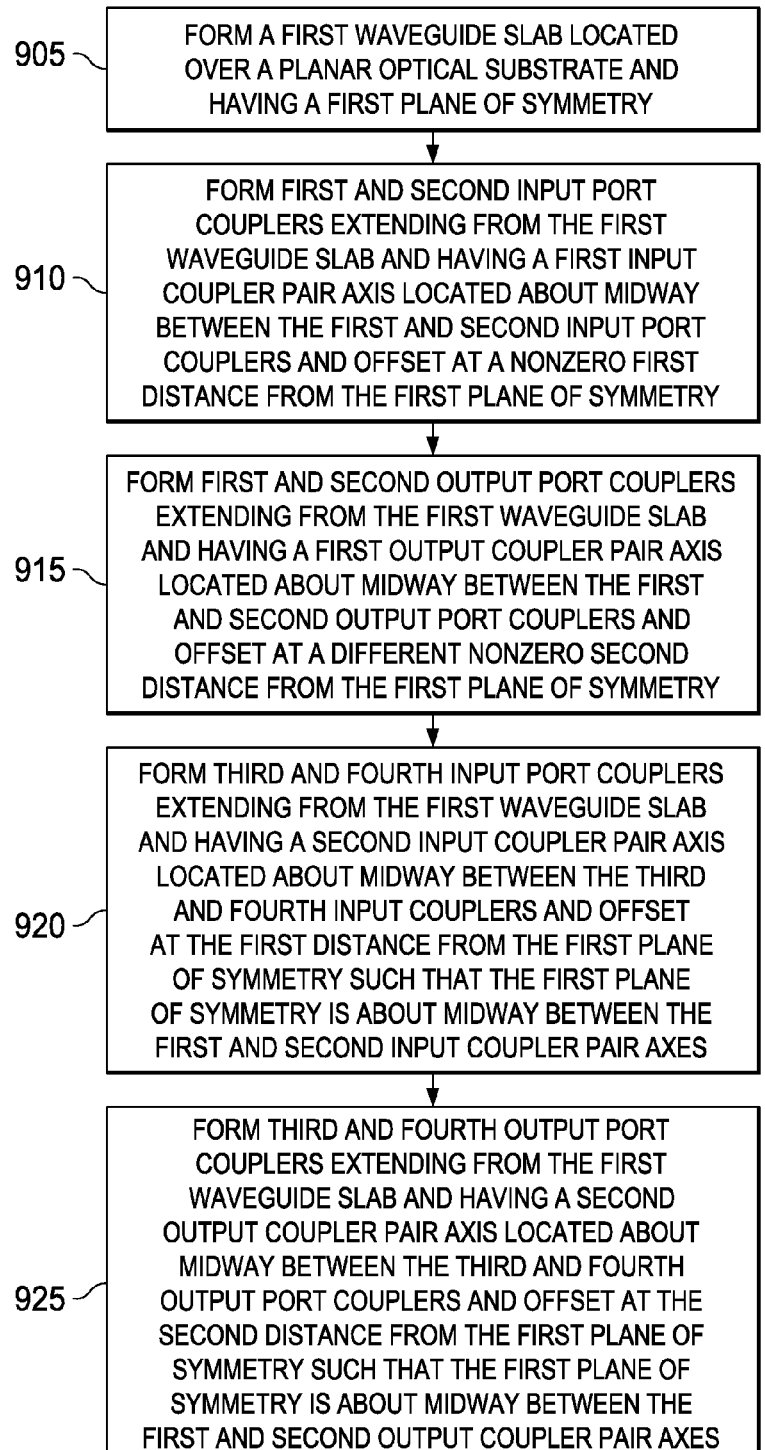
Figure 9B:
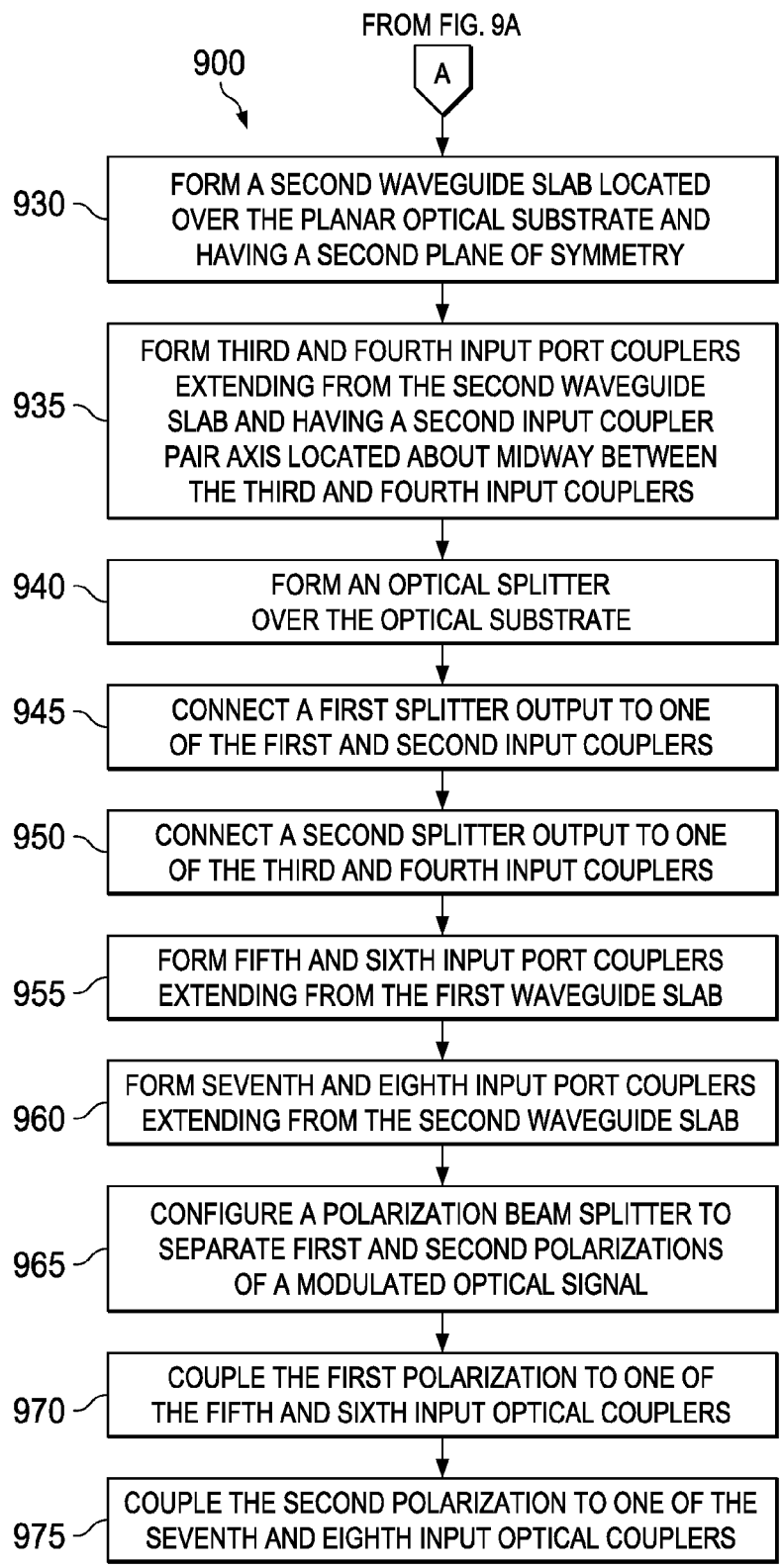

FIGS. 3A and 3B respectively illustrate top and side views of an optical path representative of various optical paths of the optical device 100 in one embodiment of the disclosure;

FIGS. 3C-3G illustrate sectional views through the optical path of FIG. 3A;

FIG. 4 illustrates a section of a dilute waveguide stack that may be used in various embodiments, including the optical device 100 of FIG. 1;

FIG. 5 illustrates a section of a passive waveguide stack that may be used in various embodiments, including the optical device 100 of FIG. 1;

FIG. 6 illustrates a section of a photodiode stack that may be used in various embodiments, including the optical device 100 of FIG. 1;

FIGS. 7A though 7D and 7B illustrate aspects of a 90° optical hybrid that may be used in various embodiments of the optical device 100; and FIGS. 8, 9A and 9B illustrate methods of the disclosure, e.g. of forming optical devices of the disclosure, such as described by FIGS. 1-7.

DETAILED DESCRIPTION

Some embodiments described herein provide a photonic integrated circuit (PIC) that integrates optical functions in an innovative manner that reduces complexity of an optical device or system using the PIC. More specifically, in some embodiments an optical splitter and a pair of 90° optical hybrids formed on a common optical substrate are combined with an external polarization beam splitter (PBS) to provide a polarization diverse (PD) coherent phase detection receiver that does not require adjustment of optical path lengths via an electrically powered phase adjuster. This configuration of elements significantly simplifies some optical system designs.

This arrangement of functions is enabled in part by the use of innovative design features that improve precision of the optical functions provided on the PIC. Some optical components are sensitive to variation of physical dimensions of device features, or to departures from nominal design values of such dimensions. Embodiments described herein reduce such dimensional errors in part by employing high precision patterning processes and using dummy physical features (described further below) that reduce process variation of such processes. Moreover, wide bandwidth operation is provided by design factors that reduce phase errors across an optical communication band of operation.

Turning initially to FIG. 1, illustrated is a schematic diagram of an optical device 100, e.g. a coherent phase detection receiver. The optical device 100 includes a PIC 110 and a PBS 120 external to the PIC 110. The PIC 110 includes a passive 3 dB splitter 130, an X hybrid 140 and a Y hybrid 150. The optical device 100 may be used e.g. to receive a polarization multiplexed optical signal, wherein each polarization may be modulated by quadrature phase-shift keying (QPSK).

The PBS 120 receives a modulated signal, e.g. from a single-mode optical fiber (not shown). The signal may include two different polarizations, X and Y, that may be orthogonal. The PBS 120 separates the X and Y polarization components and outputs these components as SX and SY signals. The splitter 130 receives a local oscillator (LO) signal and splits the LO into equal portions, an LOX and an LOY signal. The splitter 130 is a non-polarizing splitter, meaning received X and Y polarization components are divided about equally between the LOX and LOY output signals. The X hybrid 140 receives the SX and the LOX signals, and the Y hybrid 150 receives the SY and the LOY signals. The X hybrid 140 produces balanced in-phase and quadrature optical signal pairs that are converted to the electrical domain by photodiodes 160 to produce X channel outputs XIp/XIn and XQp/XQn. The Y hybrid 150 produces balanced in-phase and quadrature optical signal pairs that are converted to the electrical domain by photodiodes 170 to produce Y channel outputs YIp/YIn and YQp/YQn. In various embodiments the photodiodes 160, 170 are mesa diodes.

It is desirable in the optical device 100 that the extinction ratio between output polarizations of the PBS 120 be great enough to provide good isolation between channels at the PBS 120 outputs. In some embodiments the extinction ratio is at least about 13 dB, with about 20 dB or greater being preferred. Nonlimiting examples of suitable devices include a fiber splitter, a prism assembly, or a micro-optic device. Such devices are known to those skilled in the optical arts.

Some conventional coherent receivers include a PBS for the LO and a PBS for the received modulated signal. Such receivers have been implemented on a single substrate, but typically require a phase adjustment region, e.g. a thermo-optic or electro-optic phase shifter in an optical path between one or both PBSs and the optical hybrids. The phase adjuster regions typically require associated electrical contacts and interconnections to provide operating power. In some cases such a power requirement is inconvenient, expensive, or not feasible in a particular system design.

This disclosure benefits from the recognition by the inventors that the phase shifter regions may be eliminated from the receiver design when the receiver system has the architecture illustrated in FIG. 1. The optical device 100 is expected to be sensitive to variation of physical dimensions due to process variation in the formation process. However, high resolution patterning may be used to form optical components with high dimensional precision, including waveguides with a root-mean-square (RMS) width variation of about 100 nm or less. When the PBS 120 is removed from the substrate, a PBS type may be used that has optical path lengths that are precise, stable and not affected by process variation on the PIC 110. Finally, the hybrids 140, 150 are implemented in an innovative optical hybrid design that reduces sensitivity to process variation and provides wide bandwidth operation. When the geometries of the splitter 130, the hybrids 140, 150 and the waveguides therebetween are manufactured with a sufficiently high dimensional tolerance, no phase correction is needed along the waveguides. Thus, the optical device 100 may be operated without any phase adjustment regions, obviating the need for associated power and control mechanisms. In some cases such a system provides significant advantage in a receiver system design.

Figure 2:
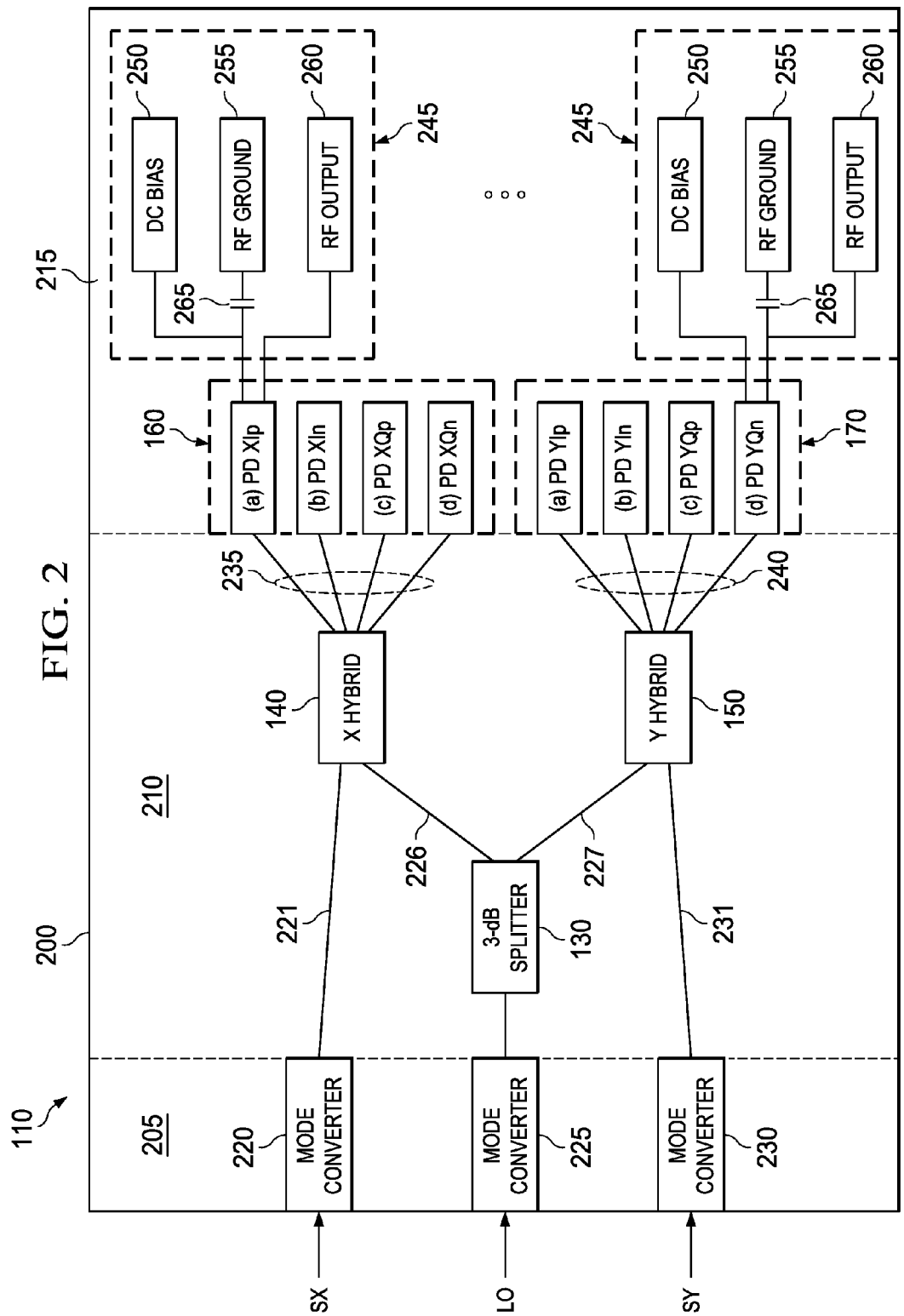
FIG. 2 illustrates a physical element block diagram of the optical device 100 in one embodiment of the disclosure.

FIG. 2 illustrates a physical element block diagram of the PIC 110. The PIC 110 is formed on an optical substrate 200. The optical substrate may be an appropriate substrate material type based on the optical band for which that the optical device 100 is configured to operate, e.g. InP for C band (1530 nm-1565 nm) and/or L band (1565 nm-1625 nm) operation. For example, the substrate 200 may be a wafer or a portion of a wafer of the substrate material. The substrate may be doped, e.g. with iron to convey semi-insulating properties, and may further include a buffer layer, e.g. InP, formed thereover to optically isolate the optical elements of the PIC 110.

The substrate 200 includes a mode conversion section 205, a passive section 210 and a photodetector section 215. The mode conversion section 205 includes mode converters 220, 225 and 230. The passive section 210 includes the splitter 130 and the hybrids 140, 150. The splitter 130 receives the output of the mode converter 225 via an unreferenced waveguide. The X hybrid 140 receives the output of the mode converter 220 via a waveguide 221 and one of the outputs of the splitter 130 via a waveguide 226. The Y hybrid 150 receives the output of the mode converter 230 via a waveguide 231 and the other of the outputs of the splitter 130 via a waveguide 227.

The photodetector section 215 includes photodiodes 160a-d and photodiodes 170a-d. The X hybrid 140 provides optical outputs XIp, XIn, XQp and XQn to the respective photodiodes 160a-d via waveguides 235. The Y hybrid 150 provides optical outputs YIp, YIn, YQp and YQn to the respective photodiodes 170a-d via waveguides 240. Each photodiode 160a-d, 170a-d is connected to an instance of a bias/output cell 245. Each cell 245 includes a DC bias contact 250, an RF ground contact 255 and an RF output contact 260. The DC bias contact 250 and the RF ground contact 255 are capacitively coupled via a capacitor 265. The contacts 250, 255 may be connected to an external power source, and the contact 260 may be connected to an external decoder.

The photodiodes 160, 170 may be of any suitable type. In some embodiments PIN photodiodes may be used. Alternatively unitravelling carrier (UTC) photodiodes may be used. In some cases UTC photodiodes may tolerate higher optical input power as compared to PIN type detectors. Moreover, UTC photodiodes typically provide a superior frequency response and therefore a greater bandwidth than PIN type detectors. Embodiments are described herein without limitation as including UTC type photodetectors. Those skilled in the pertinent art are able to adapt the methods described herein to substitute PIN, or other suitable photodiodes for the UTC photodiodes.

The PIC 110 may receive the SX, SY and LO signals via single mode fibers (SMFs, not shown). The SMFs may be butt-coupled to each of the mode converters 220, 225 and 230. The mode converters 220, 225, 230 operate to couple the propagating mode of the SX, SY and LO signals in each SMF to a planar waveguide propagating mode on the PIC 110. Thus, for instance, the mode converter 220 converts the SMF propagation mode of the SX signal to the waveguide 221 propagating mode.

FIGS. 3A and 3B respectively illustrate top and side views of an optical path 300 including a mode converter 305, and a passive optical waveguide 310, and a photodiode stack 325. Viewing FIG. 3B, the mode converter 305 falls within the mode conversion section 205; the passive optical waveguide 310 falls within the passive section 210; and the photodiode stack 325 falls within the photodetector section 215. FIGS. 3A and 3B do not correspond to any particular specific elements of the PIC 110, but are instead intended to illustrate aspects of the three-dimensional structure of the PIC 110. In particular, the mode converter 305 is representative of the mode converters 220, 225, 230 and the waveguide 310 is representative of the waveguides 221, 226, 227 and 231.

FIG. 3B shows three vertical regions over the substrate 200, a dilute waveguide stack 315, a passive waveguide stack 320, and a photodiode stack 325. Each of the stacks 315, 320 and 325 include a plurality of material layers as described below. The lateral limits of the mode conversion section 205, passive section 210 and the photodetector section 215 are marked for reference.

Figure 3C:
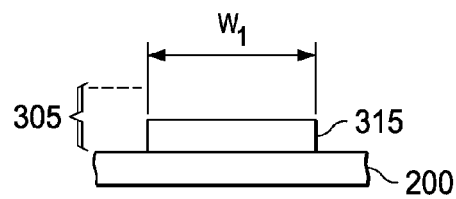
Figure 3D:
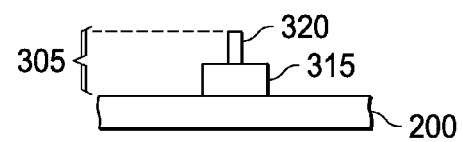
Figure 3E:
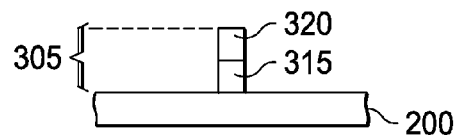
Figure 3F:
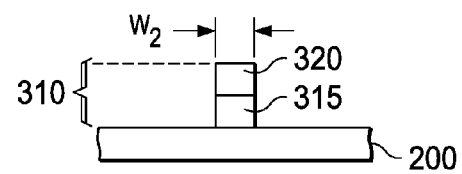
Figure 3G:
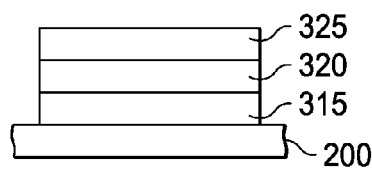

Within the mode conversion section 205, the dilute waveguide stack 315 and the passive waveguide stack 320 are vertically and laterally defined to form the mode converter 305. The mode converter 305 acts to effectively couple light received by the flared portion 330 that is initially propagating via a fiber waveguide propagation mode to a propagation mode of the passive waveguide stack 320. The mode converter 305 includes a flared portion 330 of the stack 315. The flared portion 330 has an initial width $W_1$, as illustrated in FIGS. 3A and 3C. Over a length $L_1$, the stack 315 is covered by neither the stack 320 nor the photodiode stack 325. Over a length $L_2$, the stack 320 partially or completely overlies the stack 315. The stack 320 has a tapered portion 335 that begins with an edge and widens to a width $W_2$ over the length $L_2$. It is believed that the gradual widening of the tapered portion 335 aids coupling of light from the flared portion 330 to the passive waveguide stack 320, e.g. by minimizing discontinuities that could act to scatter light. It is further believed that as the flared portion 330 narrows, light is coupled from the dilute waveguide stack 315 to the passive waveguide stack 320, and propagates further along the passive section 220 within both the dilute waveguide stack 315 and the passive waveguide stack 320. FIGS. 3D and 3E illustrate two additional locations as the width of the tapered portion 335 increases. Within the passive section 210 the passive waveguide stack 320 and the dilute waveguide stack 315 are about coextensive, as illustrated in FIG. 3F. Within the photodetector section 215 the stacks 315, 320, 325 are all about laterally coextensive, as illustrated in FIG. 3G. The lateral limits of the photodetector section 215 may be determined to provide space for the photodiodes 160, 170 and the bias/output cells 245.

The received optical signal is coupled from the dilute waveguide stack 315 into the passive waveguide stack 320 and propagates within the waveguide 310 in part by evanescent coupling. The optical signal propagates as determined by the optical paths defined in the stacks 315, 320 to the photodetector section 215. The optical energy received by to the photodetector section 215 couples to the photodiodes formed in the stack 325 by optical processes known to those skilled in the art, where the optical energy is converted to an electrical signal proportional to the intensity of the optical signal.

FIG. 4 illustrates a cross section of the dilute waveguide stack 315 in greater detail. The stack includes alternating core layers 410a, 410b, and 410c of a material having a relatively higher refractive index, e.g. $In_xGa_{1-x}As_yP_{1-y}$, and cladding layers 420a, 420b and 440 of a material having a relatively lower refractive index, e.g. InP. A buffer layer 430, e.g. InP, is located between the first core layer 410a and the substrate 200. By virtue of the alternating layers 410 and 420, the mode profile of the dilute waveguide stack 315 matches closely the mode profile within the SMF providing the signal received by the mode converter 220. Thus, energy from the single mode fiber propagation mode is coupled well into the mode converter 220.

FIG. 5 illustrates a sectional view of the passive waveguide stack 320. A waveguide core layer 510 is located over the cladding layer 440. In various embodiments the core layer 510 is an $In_xGa_{1-x}As_yP_{1-x}$ layer with a thickness of about 260 nm and a photoluminescence of about 1.3 μm. A cladding/spacer layer of, e.g. InP, is located over the core layer 510. The cladding/spacer layer 520 may be about 450 nm. Finally, a matching/n contact layer 530 is located over the cladding/spacer layer 520. The matching/n contact layer 530 may be $In_xGa_{1-x}As_yP_{1-x}$ with a thickness of about 300 nm and a photoluminescence of about 1.3 μm.

The matching/n contact layer 530 provides two distinct functions. First, the layer 530 aids the coupling of light from the stack 320 to the photodiodes 160, 170. Second, the layer 530 may act as an n contact for the photodiodes 160, 170. In various embodiments the layer 530 is doped with an n-dopant, e.g. sulfur or tin to a concentration of about $1E+18$ $cm^{-3}$.

FIG. 6 illustrates a sectional view of the photodiode stack 325. A stop etch layer 610 is located over the matching/n contact layer 530. The stop etch layer may be a 20 nm of InP, n-doped to about $1E+18$ $cm^{-3}$. As described further below, the stop etch layer 610 provides etch rate contrast to a wet chemical selective etch process known to those skilled in the art that stops on the stop etch layer and thus may remove the semiconductor material outside of the diode mesa. Over the stop etch layer 610, a first collector layer 620 is formed. The first collector layer 620 is formed from an $In_xGa_{1-x}As_yP_{1-x}$ layer with a thickness of about 200 nm and a photoluminescence of about 1.3 μm. The first collector layer 620 is not intentionally doped (n.i.d.), and exhibits n-semiconducting behavior. By n.i.d. it is meant that a semiconducting layer may include impurities, e.g. from source impurities, up to a concentration that does not significantly change the intrinsic properties of the semiconductor. Such a concentration may be as high as, e.g. about $1E12$ $cm^{-3}$. A second collector layer 630 is formed from an $In_xGa_{1-x}As_yP_{1-x}$ layer with a thickness of about 200 nm and a photoluminescence of about 1.3 μm. However the second collector layer 630 is doped with an n-dopant to about $4E+16$ $cm^{-3}$.

First and second spacer layers 640 and 650 are formed over the second collector layer 630. The first spacer layer 640 is an $In_xGa_{1-x}As_yP_{1-x}$ with a thickness of about 20 nm and a photoluminescence of about 1.45. The second spacer layer 650 is $In_xGa_{1-x}As$ layer with a thickness of about 20 nm. The first and second spacer layers 640, 650 are n-doped with dopant concentrations of about $4E+16$ $cm^3$ and about $1E+17$ $cm^3$ respectively. A 180 nm $In_xGa_{1-x}As$ absorber layer 660 is located over the second spacer layer 650. The absorber layer 660 is doped with a p-type dopant, e.g. zinc or beryllium. The p-dopant concentration has a gradient profile, with a dopant concentration of about $2E+17$ $cm^{-3}$ near the interface with the second spacer layer 650, and about $3E+18$ $cm^{-3}$ near the top of the absorber layer 660. A p-doped InP barrier layer 670 is formed over the absorber layer 660. The dopant concentration in the barrier layer 670 may be about $3E+18$ $cm^{-3}$. A Q-grading layer 680 is formed over the InP barrier layer 670. An $In_xGa_{1-x}As$ p+ contact layer 690 is formed over the layer 680, and may provide a contact layer for connecting to the photodiodes 160, 170. An InP cap may be formed over the layer 695.

Table 1 below lists illustrative parameters for the various layers of the layers within the stacks 315, 320, 325. The materials listed in Table 1 are shown without limitation as being based on InP, $In_xGa_{1-x}As$ and $In_xGa_{1-x}As_yP_{1-y}$. It is to be understood that the $InP/In_xGa_{1-x}As/In_xGa_{1-x}As_yP_{1-y}$ system is illustrative of some embodiments. Other semiconductor systems may be used in other embodiments, for example $InP/In_xGa_{1-x}As/In_xGa_{1-x}As_yAl_{1-y}$. The thicknesses and dopant concentrations listed are illustrative and may represent preferred values. These parameters may vary by at least about ±60% of the listed values while maintaining functionality of the optical device 100.

TABLE 1

| Layer | Comment | Material | Thickness (nm) | Dopant Type | Dopant Concentration ($cm^{-3}$) |
|---|---|---|---|---|---|
| 695 | Cap | InP | 20 | p | 2.5E+19 |
| 690 | P+ Contact | $In_xGa_{1-x}As$ | 250 | p | 2.5E+19 |
| 680 | Q-Grading (Q 1.3) | $In_xGa_{1-x}As_yP_{1-y}$ | 50 | p | 1.0E+19 |
| 670 | Barrier | InP | 500 | p | 3.0E+18 |
| 660 | Absorber (gradient doping) | $In_xGa_{1-x}As$ | 180 | p | 2E+17-3E+18 |
| 650 | Spacer2 | $In_xGa_{1-x}As$ | 20 | n | 1.0E+16 |
| 640 | Spacer1 (Q 1.45) | $In_xGa_{1-x}As_yP_{1-y}$ | 20 | n | 1.0E+17 |
| 630 | Collector2 (Q 21.3) | $In_xGa_{1-x}As_yP_{1-y}$ | 200 | n | 4.0E+16 |
| 620 | Collector1 (Q 1.3) | $In_xGa_{1-x}As_yP_{1-y}$ | 200 | n- | n.i.d. |
| 610 | Stop Etch | InP | 20 | n | 1.0E+18 |
| 530 | Matching/n contact (Q 1.3) | $In_xGa_{1-x}As_yP_{1-y}$ | 300 | n | 1.0E+18 |
| 520 | Cladding/Spacer | InP | 450 |  | n.i.d. |
| 510 | WG Core (Q 1.3) | $In_xGa_{1-x}As_yP_{1-y}$ | 260 |  | n.i.d. |
| 440 | Cladding | InP | 750 |  | n.i.d. |
| 410c | Dilute WG (Q 1.2) | $In_xGa_{1-x}As_yP_{1-y}$ | 35 |  | n.i.d. |
| 420b | Cladding | InP | 500 |  | n.i.d. |
| 410b | Dilute WG (Q 1.2) | $In_xGa_{1-x}As_yP_{1-y}$ | 35 |  | n.i.d. |
| 420a | Cladding | InP | 500 |  | n.i.d. |
| 410a | Dilute WG (Q 1.2) | $In_xGa_{1-x}As_yP_{1-y}$ | 35 |  | n.i.d. |
| 430 | Buffer | InP | 200 |  | n.i.d. |
| 200 | InP:Fe Substrate | InP |  |  |  |

Turning to FIG. 7A, illustrated is an embodiment of a 90° optical hybrid 700 that may serve as the hybrids 140, 150 in various embodiments of the PIC 110. The hybrid 700 includes a rectangular waveguide slab 705. The slab 705 has a length $L_3$ greater than a width $W_3$. The slab 705 has a plane of symmetry 710 parallel to the long axis of the slab 705 that divides the slab 705 into a first region 715 and a second region 720.

In some embodiments the hybrid 700 is configured to operate in the optical C-band, e.g. a wavelength range of about 1530 to about 1570 nm. In such embodiments the length $L_3$ may be within a range from about 1000 µm to about 1400 µm, and the width $W_3$ may be within a range from about 20 µm to about 32 µm. In various embodiments the ratio of $L_3/W_3$ is within a range of about 30 to about 70. In one embodiment the width $W_3$ is about 24 µm and the length $L_3$ is about 1200 µm. In some embodiments the hybrid 700 is configured to operate in the optical L-band, e.g. a wavelength range of about 1560 to about 1610 nm. Any dimensional adjustments to needed to support L-band operation may be determined by one skilled in the pertinent art.

The hybrid 700 also includes a number of optical ports provided by instances of a port coupler 745. In some embodiments exemplified by FIG. 7A the port couplers 745 are organized in pairs. Input port pairs 725 and 730 are respectively connected to an input side of regions 715 and 720. Output port pairs 735 and 740 are respectively connected to an output side of regions 715 and 720. The port couplers 745 of the input port pairs 725 and 730 provide four potential input positions designated 1-4 to the hybrid 700.

FIG. 7B illustrates one instance of the port coupler 745. While the port coupler 745 is illustrated in isolation, it is understood to be an extension of the slab 705 such that there is no gap or interface between the slab 705 and the port coupler 745. The port coupler 745 is tapered, such that it has a narrower end and a wider end, with the wider end being adjacent the slab 705. The port coupler 745 provides a tapered waveguide section between a waveguide and the slab 705 that is expected to provide a larger aperture where the port coupler 745 meets the hybrid 700 than would be the case for a similar untapered structure. The port coupler 745 is not limited to having any particular taper profile. Illustrative taper profiles include trapezoidal (or linear), as shown in FIGS. 7A and 7C, exponential, or parabolic as shown in FIG. 7B. The port coupler 745 has a major axis 750. In some embodiments the port coupler 745 is symmetric about the axis 750, in which case the axis 750 is also a line of symmetry.

The port coupler 745 has a length $L_4$, a width $W_4$ at the end that is adjacent the slab 705, and a width $W_5$ at the end opposite the slab 705. These parameters may be selected depending on the wavelength of the light propagating within the hybrid 700. In particular $W_5$ may match a width of a waveguide connected to the port coupler 745. A ratio of $L_4/W_4$ may be within a range of about 30 to about 150, with about 50 being preferred in some embodiments. In a nonlimiting example for the case of C-band light, $W_4$ may be about 4.2 µm, $W_5$ may be about 1.7 µm and $L_4$ may be in a range within about 50 µm to about 400 µm, with about 100 µm being preferred in some embodiments.

FIG. 7C illustrates the input port pair 725, and is illustrative of the other port pairs 730, 735 and 740. The input port pair 725 may be characterized by a distance $D_1$ between the port couplers 745. As described below, $D_1$ may be a value that improves process uniformity of the hybrid 700 due to, e.g.

proximity effects. The two port couplers 745 of the input port pair 725 are arranged such that their major axes 750 (e.g. lines of symmetry) are equally spaced on either side of a coupler pair axis 755 by a distance $D_2$. In other words, the major axes 750 of the port couplers 745 are separated by a distance of about $2*D_2$ and the coupler pair axis 755 is centered between the port coupler 745 major axes 750. Continuing the nonlimiting example of C-band light $D_2$ may be in a range within about 2 to about 4 μm. Returning to FIG. 7A, the port pairs 730, 735 and 740 have respective coupler pair axes 760, 765 and 770.

Referring back to FIG. 7A, the coupler pair axis 755 is spaced at a distance $D_3$ above the plane of symmetry 710 of the slab 705 as viewed in FIG. 7A. The coupler pair axis 765 is spaced at a different second distance $D_4$ above the plane of symmetry 710. Similarly the coupler pair axis 760 is spaced at the distance $D_3$ below the plane of symmetry 710, and the coupler pair axis 770 is spaced at the distance $D_4$ below the plane of symmetry 710. When arranged in this manner it is apparent that the first portion 716 including the associated port pairs 725, 735 is mirror symmetric about the plane of symmetry 710 with the second portion 721 including the associated port pairs 730, 740.

In FIG. 7A the first region 715 includes a centerline 711 that divides the first region 715 into two equal portions. In the illustrated embodiment the coupler pair axis 755 of the input port pair 725 is spaced a distance $D_5$ above the centerline 711, and the coupler pair axis 765 of the output port pair 735 is spaced a distance $D_6$ below the centerline 711. In some embodiments the coupler pair axes 755 and 765 are equally and oppositely spaced from the centerline 711, so that $D_5$ is about equal to $D_6$. In the example of C-band light, $D_5$ and $D_6$ may each be within a range from about −2 μm to about +2 μm. The second input port pair 730 and the second output port pair 740 may be arranged similarly with respect to the second region 720. However, in various embodiments a distance $D_7$ between a port coupler 745 of the input port pair 725 and a port coupler 745 of the input port pair 730 is greater than $D_1$ (FIG. 7C), and in some embodiments is at least about 4-6 μm when the hybrid 700 is configured for C-band operation. Similarly, in various embodiments a distance $D_8$ between a port coupler 745 of the output port pair 735 and a port coupler 745 of the output port pair 740 is greater than $D_1$, and in some embodiments is at least about 2 μm. This configuration differs from some conventional optical devices, e.g. MMIs, in which optical ports are typically uniformly spaced relative to each other at the input and/or output sides of the device.

In various embodiments only two of the four port couplers 745 of the input port pairs 725, 730 are coupled to an input optical signal. For example, the waveguide 221 (FIG. 2) may be connected to one input port coupler 745 and the waveguide 226 may be connected to another input port coupler 745 with the remaining input ports 745 being unconnected to an input waveguide. The port couplers 745 receiving input optical signals may be referred to as functional port couplers. The port couplers that do not receive an optical signal may be referred to as dummy port couplers. More specifically, the input ports 1 and 2, 1 and 3, 2 and 4 or 3 and 4 may be connected to the waveguides 221 and 226. The input port combinations 1 and 4 or 2 and 3 are not expected to result in the necessary linear combinations of electric fields in the interacting electromagnetic waves with the slab 705 to result in 90° hybrid operation of the hybrid 700. The different combinations of input couplers will typically result in different ordering of the Ip, In, Qp and Qn signals (FIG. 2).

When configured as illustrated, the hybrid 700 may provide balanced optical performance over a wider wavelength range (e.g. optical bandwidth) than a conventionally configured hybrid. In other words, the described configuration of the hybrid 700 skews the input wavelength of the hybrid 700 so that it may capture interfering light at wavelengths offset from the center frequency of the applicable optical band, e.g. C-band or L-band, that would otherwise be lost in a conventional 90° hybrid based on a conventional MMI configuration that has evenly spaced inputs and outputs. Thus the optical device 100 may operate in a wavelength range from about 1530 nm to about 1570 nm, equivalent to a bandwidth of about three times greater, (e.g. 40 nm vs. 10 nm) than a similar optical device based on a conventional hybrid design.

The operation of the optical device 100 is sensitive to the optical path lengths of the waveguides 221, 226, 227 and 231 and to the dimensions of the splitter 130 and the hybrids 140, 150 (e.g. the hybrid 700). Typically, conventional PIC devices are formed using a relatively low-resolution patterning technique, such as contact printing, of various patterned layers. Many contact printing methods are not capable of producing features with sufficient tolerance and/or reproducibility to produce the PIC 110 without phase adjusters. Therefore in various embodiments layers of the PIC 110 are patterned using optical I-line lithography and/or electron beam direct write lithography and dry (plasma) etch processes. Using such processes, feature dimensions may be produced with a reproducibility of about 100 nm or less. For example, referring to FIG. 3B, using I-line lithography the root mean square (RMS) variation of $W_2$ may be 100 nm or less. Such reproducibility is generally sufficient to produce the PIC 110 with commercially viable yields.

Furthermore the hybrid 700 may be sensitive to variation of patterning processes, e.g. I-line lithography and plasma etch processes. Typically the optical characteristics of the hybrid 700 will in turn vary with the variation of physical dimensions. Thus consistency and precision of optical properties may be improved by minimizing the sensitivity of physical dimensions to patterning process variation. Placement of the port couplers 745 in pairs at the described distance is expected to improve the accuracy and/or reproducibility of the dimensions of the port couplers 745, particularly where the port couplers 745 meet the slab 705. It is thought that process variation of the lithography and etch processes is reduced by the proximity of adjacent port couplers 745. For example, $D_1$ (FIG. 7C) may be within a range from about 0.2 μm to about 1.0 μm to realize a beneficial proximity effect. This improvement is in turn expected to provide more precise control of the phase of the signals output by the hybrid 700.

For example, when the hybrid 700 is formed according to various embodiments, the hybrid 700 is expected to separate I and Q channels of a QPSK signal with no more than about ±5° of phase error for input wavelengths within a range of about 1530 nm to about 1570 nm, or within a range of about 1560 nm to about 1610 nm. This aspect makes the hybrid 700 particularly well-suited to demodulating wavelength-division-multiplexed (WDM) signals.

While pairing a functional port coupler 745 with a second port coupler 745 provides the aforementioned advantages, in some embodiments the redundant port coupler 745 may be omitted. Thus, for example, the waveguide 221 may be connected to the input port 1, and the waveguide 226 may be connected to the input port 3, with the input ports 2 and 4 omitted. FIG. 7D illustrates this example configuration, with the ports 2 and 4 locations shown in phantom output. It is noted that in this case a midline 775 between the ports 1 and 2 is located above the plane of symmetry 710 and the hybrid 700 is no longer symmetric about the plane of symmetry 710.

Turning to FIG. 8, a method 800 for forming the PIC 110 is presented. The method 800 is described without limitation with reference to features described in FIGS. 2-6. The steps of the method 800 may be performed in another order than the illustrated order.

In a step 810 an optical substrate is provided, e.g. the substrate 200. The substrate may be, e.g. an iron-doped InP wafer.

In a step 820, the dilute waveguide stack 315, passive waveguide stack 320, and photodiode stack 325 are formed in blanket layers, e.g. unpatterned layers. The formation may be by, e.g. metal-organic chemical vapor deposition (MOCVD) or molecular-beam epitaxy (MBE) using methods known to those skilled in the pertinent art. The parameters listed in Table 1 may be used in various embodiments, with previously described dopants used as appropriate to form n-doped and p-doped layers.

In a step 830, portions of the photodiodes 160, 170 are formed. In some embodiments the photodiodes 160, 170 are mesa diodes, and the diode mesas may be formed in this step. P-contacts and n contacts are also formed. Forming the p-contacts includes forming openings to the p+ contact layer 690 and openings to the matching/n contact layer 530 using conventional patterning techniques. The openings may be filled with any of several available metal plugs, e.g. Ti/Pt/Au, Ge/Ni/Au or W.

In a step 840, lateral extents of the dilute waveguide stack 315 are defined in the mode converter 305. The photodiode stack 325 may be removed by conventional pattern and etch, e.g. Cl-based, stopping on the matching/n contact layer 530. The passive waveguide stack 320 may be conventionally patterned and etched, e.g. with an HBr-based plasma, to form the tapered portion 335, the etch stopping on the cladding layer 440. The stack 315 may then be conventionally patterned and etched, e.g. with a $CH_4/H_2$-based plasma, to remove portions thereof, thereby defining the tapered portion 335. The particulars of such plasma etch processes are within the skill of one skilled in the art of, e.g. semiconductor plasma etching.

In a step 850 the lateral extents of the passive waveguide layer in the passive section 210 may be defined. As described previously, various feature dimensions of the splitter 130, the hybrids 140, 150 and the waveguides 221, 226, 227 and 231 may be formed using I-line lithography to precisely reproduce desired values. The photodiode stack 325 may have been removed already in the passive section 210 in the step 840. Otherwise the photodiode stack 325 may be removed in the step 850 using contact lithography to define a photoresist layer. When the matching/n contact layer 530 is exposed, the lateral extents of the splitter 130, the hybrids 140, 150 and the waveguides 221, 226, 227 and 231 may be defined using I-line lithography using an appropriate I-line resist. The layers 530, 520 and 510 may be removed by, e.g. an HBr, $Cl_2$, SiCl4, or CH4 plasma etch.

In a step 860, the diode junctions exposed in the step 830 are passivated. Passivation may be by deposition of a suitable dielectric layer such as silicon nitride deposited by low ion energy CVD technique such as ICP-CVD.

In a step 870 the PIC 110 is planarized. Planarization may include coating with a spin-on resin such as polyimide or bis(benzocyclobutene) (BCB), In a step 880 via openings over the diode p-contacts and n contacts are patterned in the planarization layer by conventional lithography and etch. The openings are conventionally filled to form metal vias.

In a step 890 metal features, e.g. the contacts 250, 255, 260 and interconnections, are conventionally formed over the planarization layer to provide power to the photodiodes 160, 170 and receive the electrical signals produced thereby.

In a step 895 the substrate 200 may be thinned and cleaved to form the separate PIC 110. The exposed facets of the mode converters 220, 225, 230 may be coated with a conventional anti-reflective (AR) coating.

Turning to FIG. 9A, a method 900 of forming an optical device is presented. The following description may refer without limitation to features previously described in FIGS. 1-7. Furthermore, the steps of the method 900 may be performed in a different order than the illustrated order.

In a step 905, a first waveguide slab, e.g. a first instance of the slab 705, is formed over a planar optical substrate. The slab 705 has a plane of symmetry 710. In a step 910, first and second input port couplers, e.g. instances of the port coupler 745, are formed that extend from the first waveguide slab. The input port couplers have a first input coupler pair axis, e.g. the axis 755, located about midway between the first and second input port couplers and offset at a nonzero first distance, e.g. $D_3$, from the first plane of symmetry. In a step 915 first and second output port couplers, e.g. instances of the port coupler 745, are formed that extend from the first waveguide slab and have a first output coupler pair axis, e.g. the axis 765, located about midway between the first and second output port couplers. The first output coupler pair axis is offset at a different nonzero second distance, e.g. $D_4$, from the first plane of symmetry In a step 920 third and fourth input port couplers are formed that extend from the first waveguide slab. The third and fourth input port couplers have a second input coupler pair axis, e.g. the axis 760, located about midway between the third and fourth input couplers and offset at the first distance from the first plane of symmetry such that the first plane of symmetry is about midway between the first and second input coupler pair axes.

In a step 925 third and fourth output port couplers are formed that extend from the first waveguide slab and have a second output coupler pair axis, e.g. the axis 740, located about midway between the third and fourth output port couplers and offset at the second distance from the first plane of symmetry such that the first plane of symmetry is about midway between the first and second output coupler pair axes.

The method 900 continues in FIG. 9B, in which a step 930 includes forming a second waveguide slab, e.g. a second instance of the slab 705, that is located over the planar optical substrate and has a second plane of symmetry In a step 935, third and fourth input port couplers are formed that extend from the second waveguide slab and have a second input coupler pair axis, e.g. the axis 760, located about midway between the third and fourth input couplers.

In a step 940 an optical splitter, e.g. the splitter 130, is formed over the optical substrate. In a step 945a first splitter output is connected to one of the first and second input couplers. In a step 950a second splitter output is connected to one of the third and fourth input couplers.

In a step 955 fifth and sixth input port couplers are formed that extend from the first waveguide slab. In a step 960 seventh and eighth input port couplers are formed that extend from the second waveguide slab. In a step 965 a polarization beam splitter, e.g. the PBS 120, is configured to separate first and second polarizations of a modulated optical signal. In a step 970 the first polarization is coupled to one of the fifth and sixth input optical couplers. In a step 975 the second polarization is coupled to one of the seventh and eighth input optical couplers.

Those skilled in the art to which this application relates will appreciate that other and further additions, deletions, substitutions and modifications may be made to the described embodiments.

What is claimed is:

1. An optical device, comprising:
   a first waveguide slab located over a planar optical substrate and having a first plane of symmetry;
   first and second input port couplers extending from said first waveguide slab and having a first input coupler pair axis located about midway between said first and second input port couplers and offset at a nonzero first distance from said first plane of symmetry; and
   first and second output port couplers extending from said first waveguide slab and having a first output coupler pair axis located about midway between said first and second output port couplers and offset at a nonzero second distance from said first plane of symmetry, wherein the nonzero second distance is different from the nonzero first distance
   wherein said first waveguide slab, said input port couplers and said output port couplers are formed in a single mode passive waveguide stack, and further comprising a dilute waveguide stack located between said optical substrate and said waveguide slab.

2. The optical device of claim 1, further comprising:
   third and fourth input port couplers extending from said first waveguide slab and having a second input coupler pair axis located about midway between said third and fourth input couplers and offset at said first distance from said first plane of symmetry such that said first plane of symmetry is about midway between said first and second input coupler pair axes; and
   third and fourth output port couplers extending from said first waveguide slab and having a second output coupler pair axis located about midway between said third and fourth output port couplers and offset at said second distance from said first plane of symmetry such that said first plane of symmetry is about midway between said first and second output coupler pair axes.

3. The optical device of claim 1, wherein said input port couplers and said output port couplers each include a tapered waveguide section.

4. The optical device of claim 3, wherein said tapered waveguide sections have a parabolic taper profile.

5. The optical device of claim 1, wherein only one of said input port couplers is configured to receive an optical signal.

6. The optical device of claim 1, wherein said first and second input port couplers are a first pair of adjacent input couplers, and, further including:
   a second pair of adjacent third and fourth input port couplers extending from said first waveguide slab and having a second input coupler pair axis located about midway between said adjacent pairs third and fourth input couplers and offset at said nonzero first distance from said first plane of symmetry such that said first plane of symmetry is about midway between said first and second input coupler pair axes, wherein:
      said second pair of third and fourth input port couplers are adjacent to said first pair of first and second input port couplers, and
      separation distance between said third input port coupler and said second input port coupler is greater than a separation distance between said first and second input port couplers.

7. The optical device of claim 1, wherein one of said first and second input port couplers is connected to a first mode converter formed in said dilute waveguide stack, and one of said third and fourth input port couplers is connected to an optical splitter located over said substrate.

8. The optical device of claim 7, wherein said first waveguide slab, said input couplers and said output couplers are configured to separate in-phase and quadrature channels of a received phase-shift-keyed optical signal received via said first mode converter, wherein said optical signal at any one wavelength in a range of about 1530 nm to about 1570 nm has a phase variation of no greater than about ±5°.

9. An optical device, comprising:
   a first waveguide slab located over a planar optical substrate and having a first plane of symmetry;
   first and second input port couplers extending from said first waveguide slab and having a first input coupler pair axis located about midway between said first and second input port couplers and offset at a nonzero first distance from said first plane of symmetry; and
   first and second output port couplers extending from said first waveguide slab and having a first output coupler pair axis located about midway between said first and second output port couplers and offset at a nonzero second distance from said first plane of symmetry, wherein the nonzero second distance is different from the nonzero first distance, further comprising:
   a second waveguide slab located over said planar optical substrate and having a second plane of symmetry;
   third and fourth input port couplers extending from said second waveguide slab and having a second input coupler pair axis located about midway between said third and fourth input couplers; and
   an optical splitter formed over said optical substrate and having a first splitter output connected to one of said first and second input couplers and a second splitter output connected to one of said third and fourth input couplers.

10. The optical device of claim 9, wherein said optical splitter is formed in a single mode passive waveguide stack located over a dilute waveguide stack, and said optical splitter is configured to receive a local oscillator signal via a mode coupler formed in said dilute waveguide stack.

11. The optical device of claim 9, further comprising:
   fifth and sixth input port couplers extending from said first waveguide slab;
   seventh and eighth input port couplers extending from said second waveguide slab; and
   a polarization beam splitter configured to:
      separate first and second polarizations of a modulated optical signal; and
      couple said first polarization to one of said fifth and sixth input optical couplers, and couple said second polarization to one of said seventh and eighth input optical couplers.

12. The optical device of claim 11, wherein said optical splitter and said input port couplers are connected by waveguides having a root mean square width variation no greater than about 100 nm.

13. A method, comprising:
   forming a first waveguide slab located over a planar optical substrate and having a first plane of symmetry;
   forming first and second input port couplers extending from said first waveguide slab and having a first input coupler pair axis located about midway between said first and second input port couplers and offset at a nonzero first distance from said first plane of symmetry; and
   forming first and second output port couplers extending from said first waveguide slab and having a first output coupler pair axis located about midway between said first and second output port couplers and offset at a nonzero second distance from said first plane of symmetry wherein the nonzero second distance is different from the nonzero first distance, wherein said first waveguide slab, said input port couplers and said output port couplers are formed in a single mode passive waveguide stack located over a dilute waveguide stack located between said optical substrate and said waveguide slab.

14. The method of claim 13, further comprising:
forming third and fourth input port couplers extending from said first waveguide slab and having a second input coupler pair axis located about midway between said third and fourth input couplers and offset at said first distance from said first plane of symmetry such that said first plane of symmetry is about midway between said first and second input coupler pair axes; and
forming third and fourth output port couplers extending from said first waveguide slab and having a second output coupler pair axis located about midway between said third and fourth output couplers and offset at said second distance from said first plane of symmetry such that said first plane of symmetry is about midway between said first and second output coupler pair axes.

15. The method of claim 13, wherein said input port couplers and said output port couplers each include a tapered waveguide section.

16. The method of claim 15, wherein said tapered waveguide sections have a parabolic taper profile.

17. The method of claim 13, wherein only one of said input port couplers is configured to receive an optical signal.

18. The method of claim 13, wherein one of said first and second input port couplers is connected to a first mode converter formed in said dilute waveguide stack, and one of said third and fourth input port couplers is connected to an optical splitter located over said substrate.

19. The method of claim 18, wherein said first waveguide slab, said input couplers and said output couplers are configured to separate in-phase and quadrature channels of a received phase-shift-keyed optical signal received via said first mode converter, wherein said optical signal at any one wavelength in a range of about 1530 nm to about 1570 nm has a phase variation of no greater than about ±5°.

20. The method of claim 13, further comprising:
forming a second waveguide slab located over said planar optical substrate and having a second plane of symmetry;
forming third and fourth input port couplers extending from said second waveguide slab and having a second input coupler pair axis located about midway between said third and fourth input couplers;
forming an optical splitter over said optical substrate;
connecting a first splitter output to one of said first and second input couplers; and
connecting a second splitter output to one of said third and fourth input couplers.

21. The method of claim 20, further comprising:
forming fifth and sixth input port couplers extending from said first waveguide slab;
forming seventh and eighth input port couplers extending from said second waveguide slab;
configuring a polarization beam splitter to separate first and second polarizations of a modulated optical signal;
couple said first polarization to one of said fifth and sixth input optical couplers; and
couple said second polarization to one of said seventh and eighth input optical couplers.

22. The method of claim 21, wherein said optical splitter is formed in a single mode passive waveguide stack located over a dilute waveguide stack, and further comprising configuring a local oscillator to provide a local oscillator signal to said optical splitter via a mode coupler formed in said dilute waveguide stack.

23. The method of claim 20, wherein said optical splitter and said input port couplers are connected by waveguides having a root mean square width variation no greater than about 100 nm.

* * * * *